(12) United States Patent
Watanabe et al.

(10) Patent No.: US 6,359,354 B1
(45) Date of Patent: Mar. 19, 2002

(54) WATERTIGHT BRUSHLESS FAN MOTOR

(75) Inventors: Kesatsugu Watanabe; Osamu Kawakami; Nobuyuki Aoki, all of Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/672,640

(22) Filed: Sep. 28, 2000

(30) Foreign Application Priority Data

Oct. 28, 1999 (JP) ............................................ 11-307320

(51) Int. Cl.[7] ................................................. H02K 5/10
(52) U.S. Cl. ........................ 310/87; 310/43; 310/154.45
(58) Field of Search ............................... 310/87, 88, 43, 310/67 R, 154.01, 154.07, 154.11, 154.44, 258

(56) References Cited

U.S. PATENT DOCUMENTS

| 4,128,527 A | * | 12/1978 | Kinjo et al. | ............. | 260/42.18 |
| 4,344,006 A | * | 8/1982 | Mendelsohn | .................. | 310/43 |
| 4,387,311 A | * | 6/1983 | Kobayashi et al. | ........... | 310/43 |
| 4,868,970 A | * | 9/1989 | Schultz et al. | ................ | 29/596 |
| 5,814,412 A | * | 9/1998 | Terada et al. | ................ | 428/458 |
| 5,880,179 A | * | 3/1999 | Ito et al. | ....................... | 523/433 |

FOREIGN PATENT DOCUMENTS

JP            10191611            7/1998

* cited by examiner

Primary Examiner—Elvin Enad
Assistant Examiner—Thanh Lam
(74) Attorney, Agent, or Firm—Rankin, Hill, Porter & Clark LLP

(57) ABSTRACT

It is the object of the present invention to provide a long-life brushless fan motor which can be used for a long time in the environmental conditions in which water containing oil mist is splashed on the fan motor. A stator 1, a circuit substrate 4 including an electronic parts and a plurality of lead wires 21 are received in a stator side case 14. These parts in the case 14 are molded with an epoxy resin having a Shore hardness of D30 to D90 after curing, thereby forming a molded part 24. The pole faces 2b of the stator magnetic poles of the stator are covered with the molded part 24.

7 Claims, 2 Drawing Sheets

WATERTIGHT BRUSHLESS FAN MOTOR

BACKGROUND OF THE INVENTION

FIELD OF THE INVENTION

The present invention relates to a watertight brushless fan motor whose stator side is molded with an insulating material.

In a conventional watertight brushless fan motor disclosed in Japanese Laid-Open No. 10-191611, a stator in a stator side case and a groove in a web for receiving a lead wire are molded with a silicone rubber to make the stator side have a watertight structure. Even the conventional watertight brushless fan motor does not encounter any problem when it is used for a usual use.

However, if the conventional watertight brushless fan motor is used for a long time in the environmental conditions in which water containing oil mist is splashed on the fan motor, it is found that the fan motor encounters problems that the insulating ability of the molded part is deteriorated and that a rotor is hard to rotate.

It is an object of the present invention to provide a watertight brushless fan motor which can be used for a long time in the environmental conditions in which water containing oil mist is splashed on the fan motor.

It is another object of the present invention to provide a brushless fan motor which has a higher watertight effect than a conventional watertight brushless fan motor.

It is still another object of the present invention to provide a brushless fan motor which can prevent water from entering the inside of an iron core from a pole face.

SUMMARY OF THE INVENTION

The present invention is a watertight brushless fan motor comprising:

a stator provided with a plurality of stator magnetic poles, each of which has a winding wound around a projecting pole of an iron core constituted by a plurality of laminated steel plates;

a circuit substrate mounted with an electronic part constituting a control circuit for controlling a current flow through the winding, the circuit substrate being fixed to the stator;

a rotor having a plurality of rotor magnetic poles, each of which is made of a permanent magnet, on the inner peripheral side and having a plurality of blades on the outer peripheral side; and a stator side case having a bearing supporting cylindrical section in which a bearing for rotatably supporting the rotary shaft of the rotor is received, a housing section for surrounding the outer periphery of the blades of the rotor, a substrate receiving section in which the circuit substrate is received, and a plurality of webs for connecting the substrate receiving section to the housing section, wherein a lead wire receiving groove for receiving a plurality of lead wires extending from the control circuit of the circuit substrate and for guiding them to the housing side is formed in one of the webs, wherein a communicating passage is formed between the lead wire receiving groove and the substrate receiving section, and wherein the stator, the circuit substrate including the electronic parts and the plurality of lead wires received in the lead wire receiving groove are molded with an electrically insulating material to form a molded part.

The present invention is characterized in that the stator, the circuit substrate including the electronic parts and the plurality of lead wires are molded with an epoxy resin having a Shore hardness of D30 to D90 after curing. The epoxy resin is resistant to oil mist and is neither swelled nor deteriorated in an insulating ability even if it is exposed to water containing oil mist for a longtime. Accordingly, this prevents the possibility that the gap between the rotor and the stator is reduced by the swelling of the molded part and that the rotation of the rotor is reduced. However, in reality, the epoxy resin is not used for forming the molded part embedding or molding the stator of the brushless fan motor. This is because it is thought that since the circuit substrate mounted with the electronic parts is positioned at the stator side, the electronic parts and the circuit substrate can not be protected from the stress generated in the insulating material which is cured to form the molded part. Also, this is because it is thought to be difficult to reduce the thickness of the molded part covering the pole faces of the stator core when the gap between the rotor and the stator is reduced to improve performance. As a result of various researches, the inventor has found that if the molded part is formed by an epoxy resin having a Shore hardness of D30 to D90 after curing, the molding accuracy and the mechanical strength of the molded part can be kept good and the stress applied to the electronic parts and the circuit substrate arranged in the molded part can be reduced and has completed the present invention.

Also, if water containing oil mist enters the bearing of the watertight brushless fan motor, it flows the grease in the bearing to greatly reduce the life of the bearing. Accordingly, in the present invention, in the case where the bearing supporting cylindrical section is shaped like a cylinder which is open at both ends, a bush fixed to the rotary shaft to fix the rotor side case to the rotary shaft and one open end portion of the bearing supporting cylindrical section are opposed to each other with a small gap between them to form a labyrinth structure for preventing water from entering the inside of the bearing. The other open end portion of the bearing supporting cylindrical section is hermetically sealed by a sealing member. If such a structure is adopted, it is possible to effectively prevent the water containing oil mist from entering the inside of the bearing and to greatly elongate the life of the bearing.

In the case where the gap between the rotor and the stator is reduced, it is difficult to keep the gap within a predetermined range even if the molding accuracy is increased. Accordingly, in this case, the molded part is made of the epoxy resin such that the pole faces of the plurality of projecting pole portions are exposed, and an insulating resin (for example, epoxy varnish) having the viscosity capable of making the insulating resin enter the inside of the iron core is applied to the pole faces of the plurality of projecting pole portions. This can reduce the gap between the pole face of the stator and the rotor and can effectively prevent the inside of the iron core from being impregnated by the water containing oil mist.

BRIEF DESCRIPTION OF THE DRAWINGS

Preferred embodiments in accordance with the present invention will be described in detail based on the following figures, in which.

DESCRIPTION OF THE PREFERRED EMBODIMENTS

Figure 1:
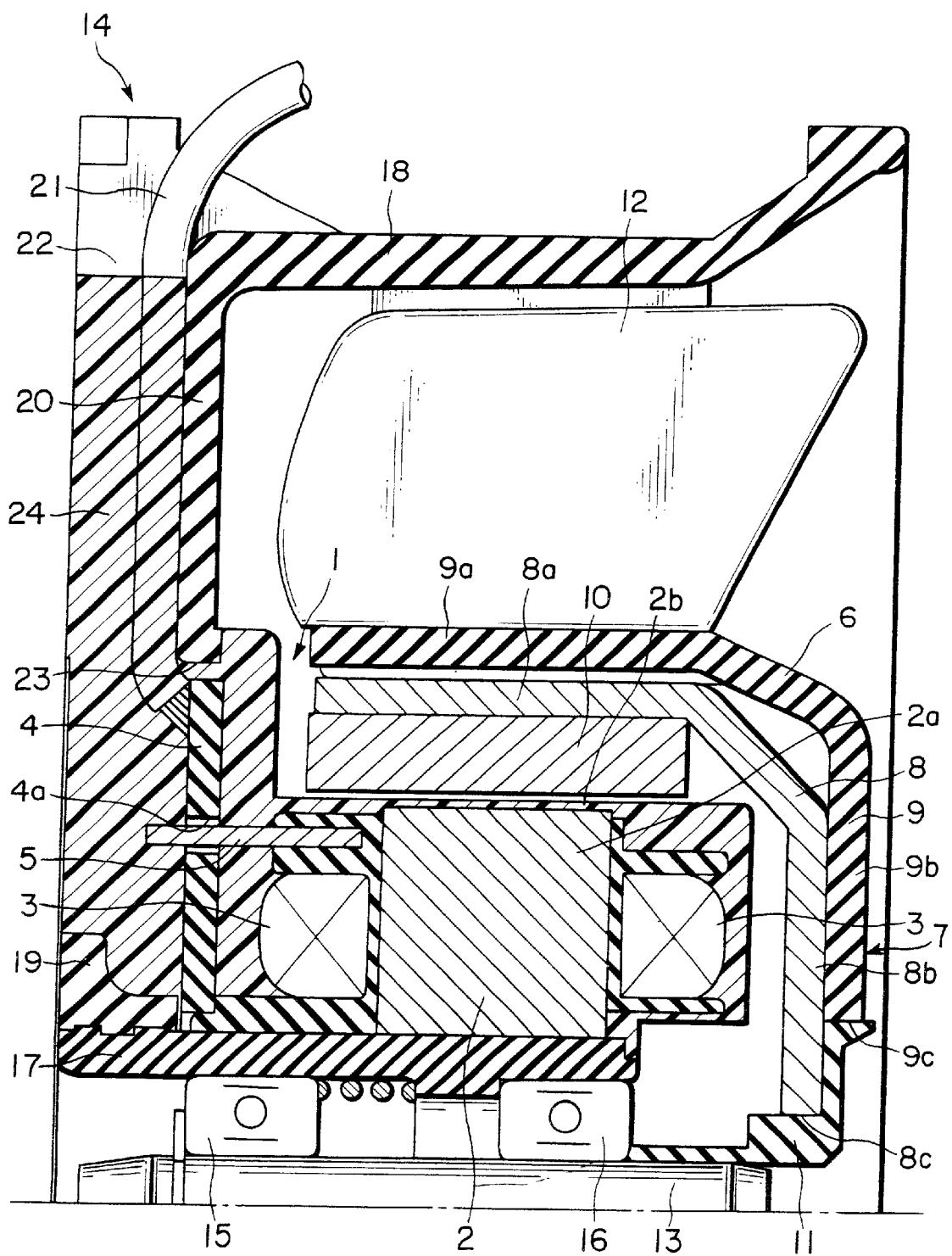
FIG. 1 is a vertical cross sectional view of a main part showing a first preferred embodiment in a watertight brushless fan motor in accordance with the present invention.

FIG. 1 is a vertical cross sectional view of a main part of a first preferred embodiment in a watertight brushless fan motor in accordance with the present invention. In FIG. 1, a member designated by a reference number 1 is a stator and the stator 1 is provided with an iron core 2 constituted by a plurality of laminated steel plates. The iron core 2 has a plurality of projecting pole portions 2a arranged in a circumferential direction. A winding 3 is wound around each projecting pole portions 2a of the iron core 2. These plurality of projecting pole portions 2a function as stator magnetic poles when the wiring 3 is excited. Accordingly, the tip end surface of each projecting pole portions 2a becomes the pole face 2b of the stator magnetic pole. A member designated by a reference number 4 is a circuit substrate fixed to the stator 1 and an electronic parts constituting a control circuit for controlling a current flow through the winding 3 constituting a part of the plurality of stator magnetic poles of the stator 1 is mounted on the circuit substrate 4. The control circuit on the circuit substrate 4 is electrically connected to the winding 3. As the lead wire of the winding 3 is wound around a terminal pin 5 which is passed through the through hole 4a of the circuit substrate 4 and soldered to the electrode on the circuit substrate 4.

A member designated by a reference number 6 is a rotor. The rotor 6 is provided with a rotor side case 7 and the rotor side case 7 is constituted by a cup member 8 made of a magnetic material and a blade mounting hub 9 fitted on the outside of the cup member 8. The cup member 8 is constituted by a cylindrical section 8a having a plurality of rotor magnetic poles 10, each of which is made of a permanent magnet, fixed to the inner peripheral portion such that they are arranged in the circumferential direction and a bottom wall section 8b blocking one end of the cylindrical section 8a. At the center of the bottom wall section 8b is formed a through hole 8c in which a bush 11 described below is fitted. The blade mounting hub 9 is constituted by a cylindrical section 9a having a plurality of blades fixed to the outer peripheral portion and a bottom wall section 9b blocking one end of the cylindrical section 9a. To the center of the bottom wall section 9b is fixed the bush 11 for fixing the rotor side case 7 to a rotary shaft 13.

A member designated by a reference number 14 is a stator side case and is constituted by a bearing supporting cylindrical section 17 in which two bearings 15, 16 for rotatably supporting the rotary shaft 13 of the rotor 6 are received, a housing section 18 for surrounding the outer peripheral portion of the plurality of blades 12 of the rotor 6, a substrate receiving section 19 which the circuit substrate 4 is received in and is fixed to, and a plurality of webs 20 for connecting the substrate receiving section 19 to the housing section 18. The plurality of webs 20 are arranged at intervals in the circumferential direction, and on one web 20 of the plurality of webs 20 is formed a lead wire receiving groove 22 for receiving a plurality of lead wires 21 connected to the control circuit of the circuit substrate 4 and for guiding them to the housing section 18 side. A communicating passage 23 is formed between the lead wire receiving groove 22 and the substrate receiving section 19.

The stator 1, the circuit substrate 4 including the electronic parts and the plurality of lead wires 21 are integrally molded with an epoxy resin by one pour. A reference number 24 designates a molded part formed in this manner. In this preferred embodiment, also the pole faces 2b of the stator magnetic poles of the stator 1 are thinly covered with the epoxy resin. To be more specific, the molded part 24 is formed with the epoxy resin having a Shore hardness of D30 to D90 after curing. An epoxy resin having a Shore hardness smaller than D30 after curing has flexibility but has low reliability because it has low heat resistance and low adhesive ability after it is cured. In contrast to this, an epoxy resin having a shore hardness larger than D90 after curing has high heat resistance and high adhesive ability but has low flexibility after it is cured, which might result in causing damage to the circuit substrate and the electronic parts. The epoxy resin used in the present invention which has a Shore hardness smaller than D90 after curing is satisfactory in the properties of flexibility, heat resistance, and adhesive ability after it is cured. In this connection, an epoxy resin having a Shore hardness of D58 after curing and marketed as a product number ME-370S by Nippon Pernox Co. is used in the present preferred embodiment.

A mold for forming the molded part 24 is formed in such a way that the epoxy resin flows from the lead wire receiving groove 22 side of the web 20 in which the lead wires 21 are received to the stator 1 side. This structure can make it possible to mold the epoxy resin by one operation, which results in reducing the number of operations. Also, the molded part 24 does not have the interface of two molded parts, which improves the watertight effect. Further, since the pole face 2b of the stator magnetic poles of the stator 1 are also covered with the epoxy resin, it is possible to prevent water from entering the inside of the iron core 2 from the pole faces 2b of the stator magnetic poles.

Figure 2:
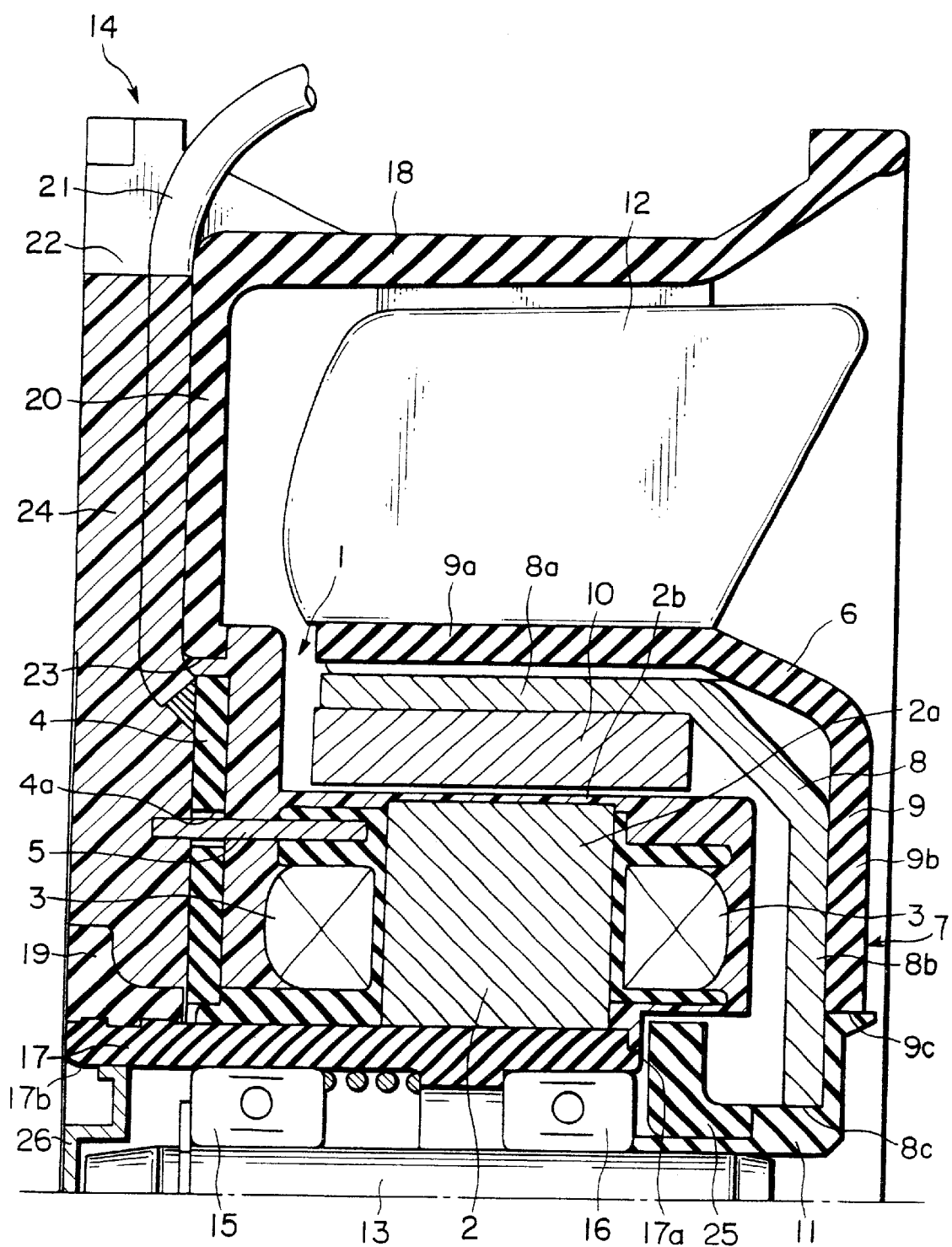
FIG. 2 is a vertical cross sectional view of a main part showing a second preferred embodiment in a watertight brushless fan motor in accordance with the present invention.

FIG. 2 is a vertical cross sectional view of a main part of a second preferred embodiment in a watertight brushless fan motor in accordance with the present invention. In the preferred embodiment shown in FIG. 2, the like reference numbers are attached to the like parts in the first preferred embodiment shown in FIG. 1 and the description thereof will be omitted. In this watertight brushless fan motor, a labyrinth structure for forming a small gap between one open end portion 17a of a bearing supporting cylindrical section 17 which is open at both ends and an annular member 25 fitted in a bush 11 and constituting a part of the bush 11. Also, on the other open end portion 17b of the bearing supporting cylindrical section 17 is fitted a cap 26 as a sealing member for hermetically sealing (closing) the opening of the open end portion 17b. In this preferred embodiment, the labyrinth structure and the cap 26 as the sealing member can effectively prevent water containing oil mist from entering the bearings 15 and 16 in the bearing supporting cylindrical section 17 and from flowing grease from the bearings 15 and 16. The preferred embodiment shown in FIG. 2 is the same in the other constitution as the preferred embodiment shown in FIG. 1.

If a structure is adopted in which the tops of the pole faces 2b are covered with the molded part 24, as is the case with the preferred embodiment described above, in the case where the gap between the rotor and the stator is made small, it is difficult to keep the gap within a predetermined range even if the molding accuracy of the molded part is made higher. Therefore, in this case, the molded part is formed in such manner that the pole faces 2b of the plurality of projecting pole portions are exposed. Then an insulating resin having the viscosity capable of making the insulating resin enter the inside of the iron core (for example, epoxy varnish) is applied to the pole faces of the plurality of projecting pole portions. This makes the insulating resin having low viscosity enter the gaps between the plurality of steel plates constituting the iron core 2 and exerts a watertight effect. Therefore, this can reduce the gap between the pole face of the stator and the rotor to effectively prevent the inside of the iron core being impregnated with water containing oil mist.

The present invention produces advantages that the watertight brushless fan motor can be used in the environmental conditions in which water containing oil mist is splashed on the fan motor and that the stress applied to the electronic parts and the circuit substrate arranged in the molded part can be reduced.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A watertight brushless fan motor comprising:
   a stator provided with a plurality of stator magnetic poles each of which has a winding wound around a p projecting pole portion of an iron core constituted by a plurality of laminated steel plates;
   a circuit substrate mounted with electronic parts constituting a control circuit for controlling a current flow through the winding, the circuit substrate being fixed to the stator;
   a rotor having a plurality of rotor magnetic poles, each of which is made of a permanent magnet, on the inner peripheral side and having a plurality of blades on the outer peripheral side;
   a stator side case having a bearing supporting cylindrical section in which a bearing for rotatably supporting the rotary shaft of the rotor is received, a housing section for surrounding the outer periphery of the blades of the rotor, a substrate receiving section in which the circuit substrate is received, and a plurality of webs for connecting the substrate receiving section to the housing section;
   a lead wire receiving groove formed in one of the webs and receiving a plurality of lead wires extending from the control circuit of the circuit substrate and guiding them to the housing side;
   a communicating passage formed between the lead wire receiving groove and the substrate receiving section; and
   a molded part being formed in such manner that the stator, the circuit substrate having the electronic parts and the plurality of lead wires received in the lead wire receiving groove are molded with epoxy resin having a Shore hardness of D30 to D90 after curing.

2. A watertight brushless fan motor as claimed in the claim 1, in which the epoxy resin is the epoxy resin having a Shore hardness of about D58 after curing.

3. A watertight brushless fan motor as claimed in the claim 1, wherein the bearing supporting cylindrical section is shaped like a cylinder which is open at both ends, wherein the rotor is provided with a rotor side case having the blades on the outer peripheral side and the rotor magnetic poles on the inner peripheral side and a bush fixed to the rotary shaft to fix the rotor side case to the rotary shaft, and wherein the one open end portion of the bearing supporting cylindrical section and the bush are opposed to each other with a small gap between them to form a labyrinth structure for preventing water from entering the inside of the bearing.

4. A watertight brushless fan motor as claimed in the claim 2, in which the other open end portion of the bearing supporting cylindrical section is hermetically sealed by a sealing member.

5. A watertight brushless fan motor comprising:
   a stator provided with a plurality of stator magnetic poles each of which has a winding wound around a p projecting pole portion of an iron core constituted by a plurality of laminated steel plates;
   a circuit substrate mounted with electronic parts constituting a control circuit for controlling a current flow through the winding, the circuit substrate being fixed to the stator;
   a rotor having a plurality of rotor magnetic poles, each of which is made of a permanent magnet, on the inner peripheral side and having a plurality of blades on the outer peripheral side;
   a stator side case having a bearing supporting cylindrical section in which a bearing for rotatably supporting the rotary shaft of the rotor is received, a housing section for surrounding the outer periphery of the blades of the rotor, a substrate receiving section in which the circuit substrate is received, and a plurality of webs for connecting the substrate receiving section to the housing section;
   a lead wire receiving groove formed in one of the webs and receiving a plurality of lead wires extending from the control circuit of the circuit substrate and guiding them to the housing side;
   a communicating passage formed between the lead wire receiving groove and the substrate receiving section; and
   a molded part being formed in such manner that the stator, the circuit substrate including the electronic parts and the plurality of lead wires received in the lead wire receiving groove are molded with epoxy resin having a Shore hardness of D30 to D90 after curing, and in such that the pole faces of the plurality of projecting pole portions are exposed, in which an insulating resin having viscosity capable of making the insulating resin enter the inside of the iron core is applied to the pole faces of the plurality of projecting pole portions.

6. A watertight brushless fan motor as claimed in the claim 5, in which the insulating resin is an epoxy varnish.

7. A watertight brushless fan motor as claimed in the claim 5, wherein the bearing supporting cylindrical section is shaped like a cylinder which is open at both ends, wherein the rotor is provided with a rotor side case having the blades on the outer peripheral side and the rotor magnetic poles on the inner peripheral side and a bush fixed to the rotary shaft to fix the rotor side case to the rotary shaft, wherein one open end portion of the bearing supporting cylindrical section and the bush are opposed to each other with a small gap between them to form a labyrinth structure for preventing water from entering the inside of the bearing, and wherein the other open end portion of the bearing supporting cylindrical section is hermetically sealed by a sealing member.

* * * * *